(12) United States Patent
Wirth et al.

(10) Patent No.: US 11,685,207 B2
(45) Date of Patent: Jun. 27, 2023

(54) APPARATUS AND METHOD FOR TRAILER-LIGHT PLUG COVER

(71) Applicant: WirthCo Engineering, Inc., Bloomington, MN (US)

(72) Inventors: Andrew W. Wirth, Minneapolis, MN (US); Kelly T. Eagan, Minneapolis, MN (US)

(73) Assignee: WirthCo Engineering, Inc., Minneapolis, MN (US)

( * ) Notice: Subject to any disclaimer, the term of this patent is extended or adjusted under 35 U.S.C. 154(b) by 32 days.

(21) Appl. No.: 17/575,571

(22) Filed: Jan. 13, 2022

(65) Prior Publication Data

US 2022/0134821 A1 May 5, 2022

Related U.S. Application Data

(63) Continuation of application No. 29/655,505, filed on Jul. 3, 2018, now Pat. No. Des. 941,253.

(51) Int. Cl.
*H01R 13/52* (2006.01)
*B60D 1/60* (2006.01)

(52) U.S. Cl.
CPC ......... *B60D 1/605* (2013.01); *H01R 13/5213* (2013.01)

(58) Field of Classification Search
CPC .............................. B60D 1/605; H01R 13/5213
See application file for complete search history.

(56) References Cited

U.S. PATENT DOCUMENTS

| | | | | |
|---|---|---|---|---|
| 4,731,032 A * | 3/1988 | Noorily | ................ | H01R 13/443 439/142 |
| 4,811,765 A * | 3/1989 | Giha | ........................ | B60S 5/02 141/390 |
| 5,150,808 A * | 9/1992 | Hamilton | ........... | B60K 15/0406 220/255 |
| 5,722,854 A * | 3/1998 | Geisler | ................ | H01R 13/443 439/528 |
| D448,351 S | 9/2001 | Dubose | | |
| 6,676,422 B1 * | 1/2004 | Baker | .................. | H01R 13/447 439/135 |
| 7,442,077 B2 * | 10/2008 | Peress | ................ | H01R 13/5213 439/468 |
| 7,771,221 B1 * | 8/2010 | Blackwell | .............. | H01R 13/52 439/282 |
| D629,366 S | 12/2010 | Ericson | | |
| D664,099 S | 7/2012 | Fukushima | | |
| D762,589 S | 8/2016 | Sanftleben | | |
| D765,606 S | 9/2016 | Hack | | |
| 9,526,818 B2 * | 12/2016 | Kearsley | ............. | A61M 60/538 |
| 10,340,628 B2 * | 7/2019 | Borkar | ............... | H01R 13/5213 |

* cited by examiner

*Primary Examiner* — Tho D Ta
(74) *Attorney, Agent, or Firm* — Charles A. Lemaire; Jonathan M. Rixen; Lemaire Patent Law Firm, P.L.L.C.

(57) ABSTRACT

An apparatus that includes an elastic sleeve; an integrally formed top cover that completely (or at least substantially completely) covers one end of the elastic sleeve; an integrally formed elongated clamp feature that extends outward from across a top surface of the top cover, wherein the elongated clamp feature has a C-shaped cross section; an integrally formed elongated strap that is connected at a proximal end to an edge of top cover and that has an elastic loop formed at a distal end of the elongated strap.

19 Claims, 4 Drawing Sheets

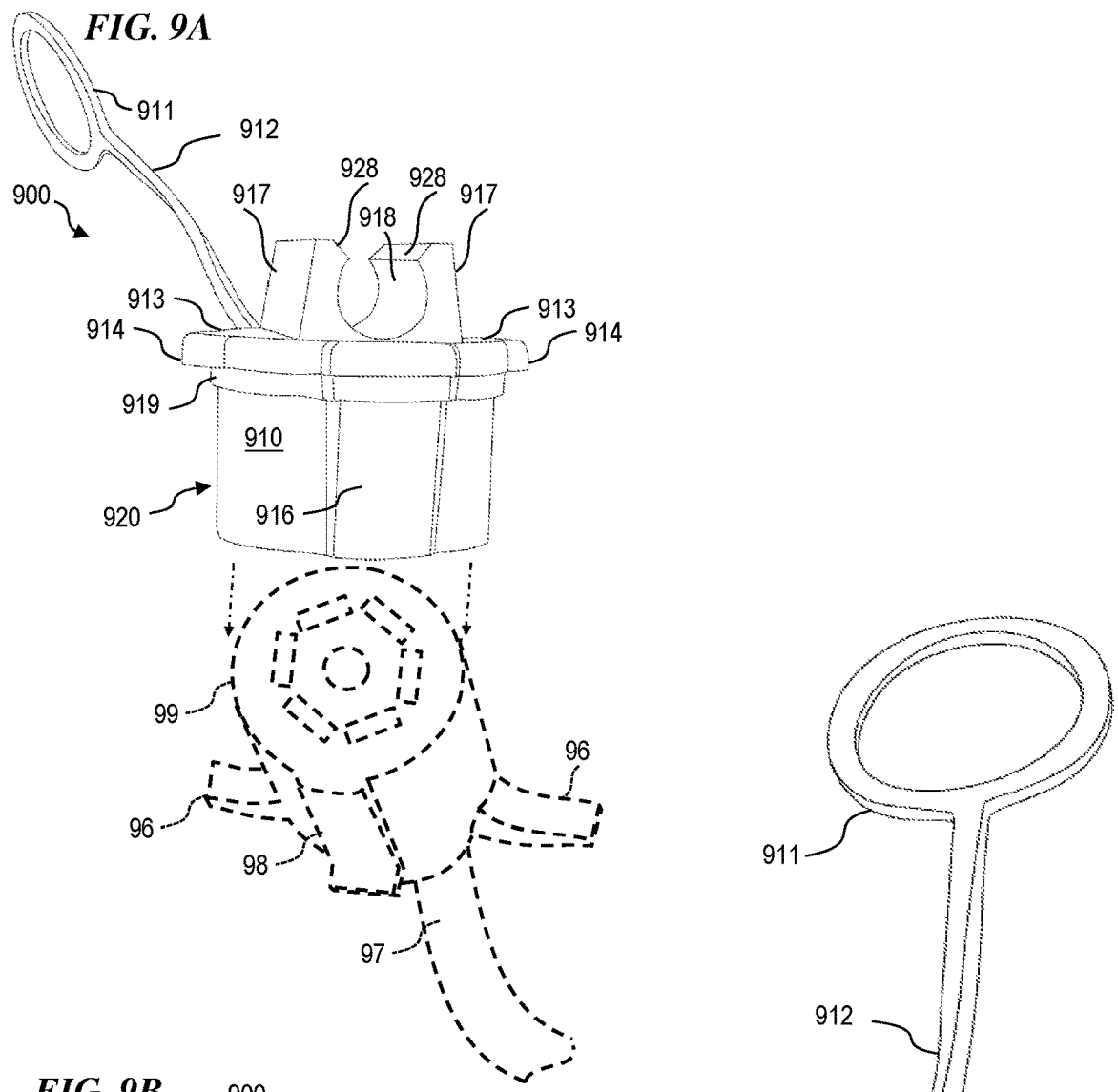

APPARATUS AND METHOD FOR TRAILER-LIGHT PLUG COVER

CROSS-REFERENCE TO RELATED APPLICATION

This application is a continuation application of U.S. Design patent application Ser. No. 29/655,505 filed Jul. 3, 2018, which is incorporated herein by reference in its entirety.

FIELD OF THE INVENTION

This invention relates to the field of protective plug covers, and more specifically to a method and apparatus for covering an electrical plug when the plug is not plugged into its receptacle, for example for a cylindrical plug for a vehicle trailer's lights when the plug is not connected to the vehicle, wherein the cover includes a looped strap and a cover-retainer structure that snaps onto the plug's cord to keep the cover from dangling when the plug is connected to the vehicle.

BACKGROUND OF THE INVENTION

It is useful to cover the plug for a vehicle trailer's lights when the plug is not connected to the vehicle, in order to prevent corrosion. Conventional simple plug covers tend to get lost, for example when the plug is connected to the vehicle and a person tries to find somewhere to store the cover.

What is needed is a cover that is conveniently and securely held on the plug's cord when the plug is connected to the vehicle so that the cover is immediately available to cover the plug at the time when the plug is disconnected from the vehicle.

SUMMARY OF THE INVENTION

The present invention provides a cover for an electrical plug that is securely held to the plug's cord when the plug is not plugged into its receptacle, for example, a cover for a cylindrical electrical plug for a vehicle trailer's lights, wherein the cover includes a strap and a cover-retainer structure that snaps onto the plug's cord to keep the cover from dangling when the plug is connected to a corresponding socket on the vehicle. In some embodiments, the cover is made of a polymer. In some embodiments, the end of the strap has an elastic loop, such as a circular loop or other suitable shape that fits over the plug, in order to keep the loop around the cord. In some embodiments, the top of the cover includes an elongated resilient C-shaped clip-on connector, which is sized and configured to securely connect the cover to the cord next to the plug, in order that when the plug is disconnected from the vehicle, the cover is conveniently removed from the cord and fitted on the end of the plug. In some embodiments, the elongated resilient C-shaped clip-on connector is integrally formed into the top of the cover. In some embodiments, the combination of the elongated resilient C-shaped clip-on connector and the strap with its loop provide a redundant connection system so that the cover does not get separated and lost when it is needed to be replaced onto the end of the plug.

BRIEF DESCRIPTION OF THE DRAWINGS

FIG. 9A is the side-front perspective view of a trailer-light plug cover 900, according to some embodiments of the present invention.
FIG. 9B is the back-bottom-side perspective view of trailer-light plug cover 900, according to some embodiments of the present invention.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
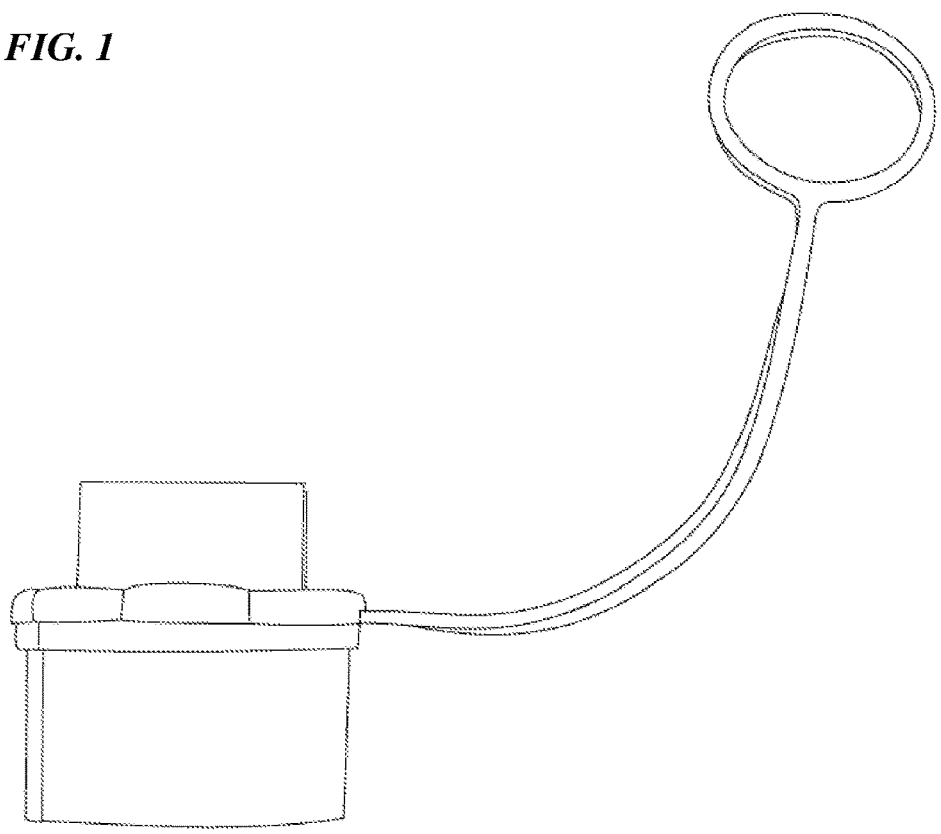
FIG. 1 is a left-side perspective view of a decorative trailer-light plug cover.
Figure 2:
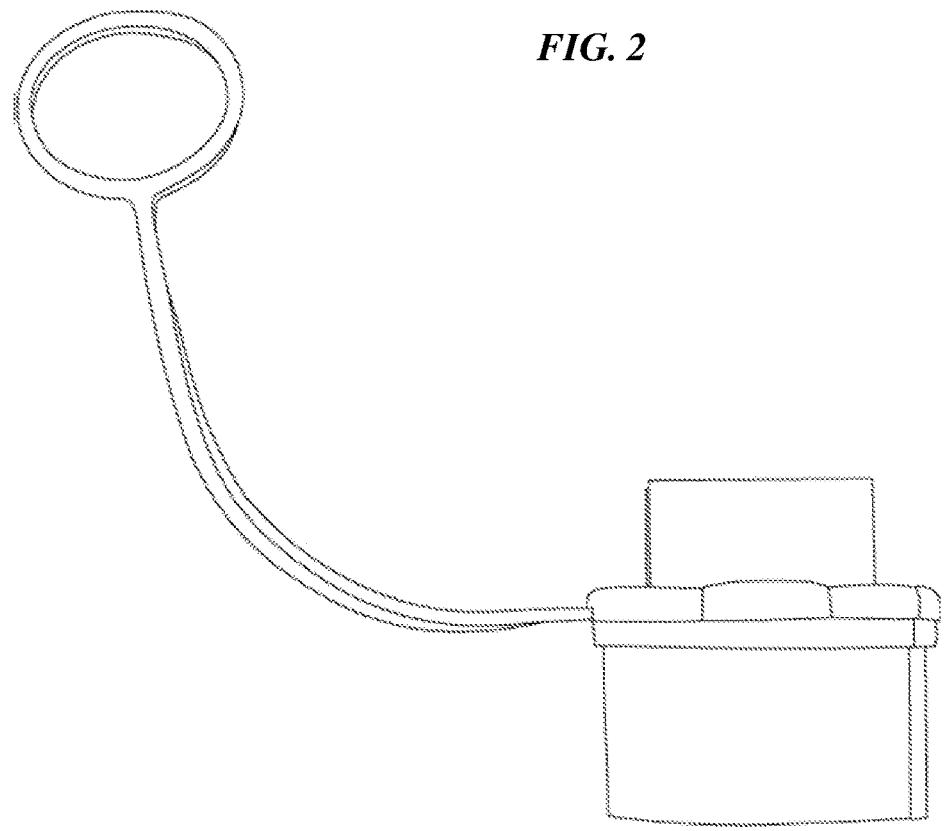
FIG. 2 is a right-side perspective view thereof.
Figure 3:
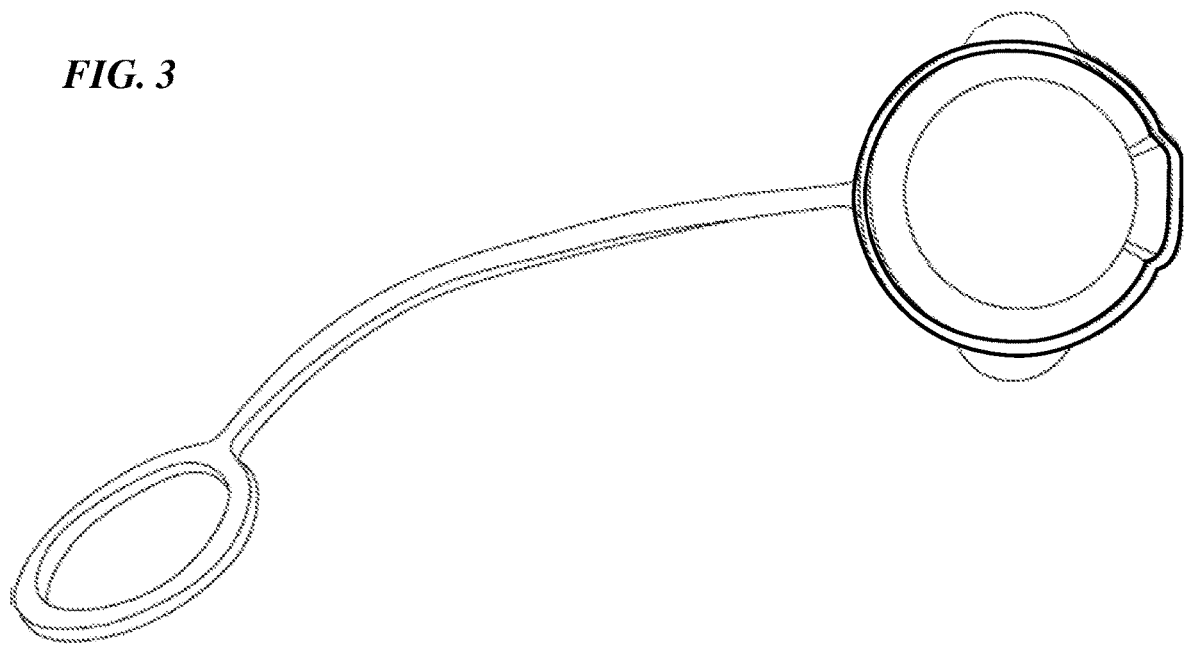
FIG. 3 is a bottom perspective view thereof.
Figure 4:
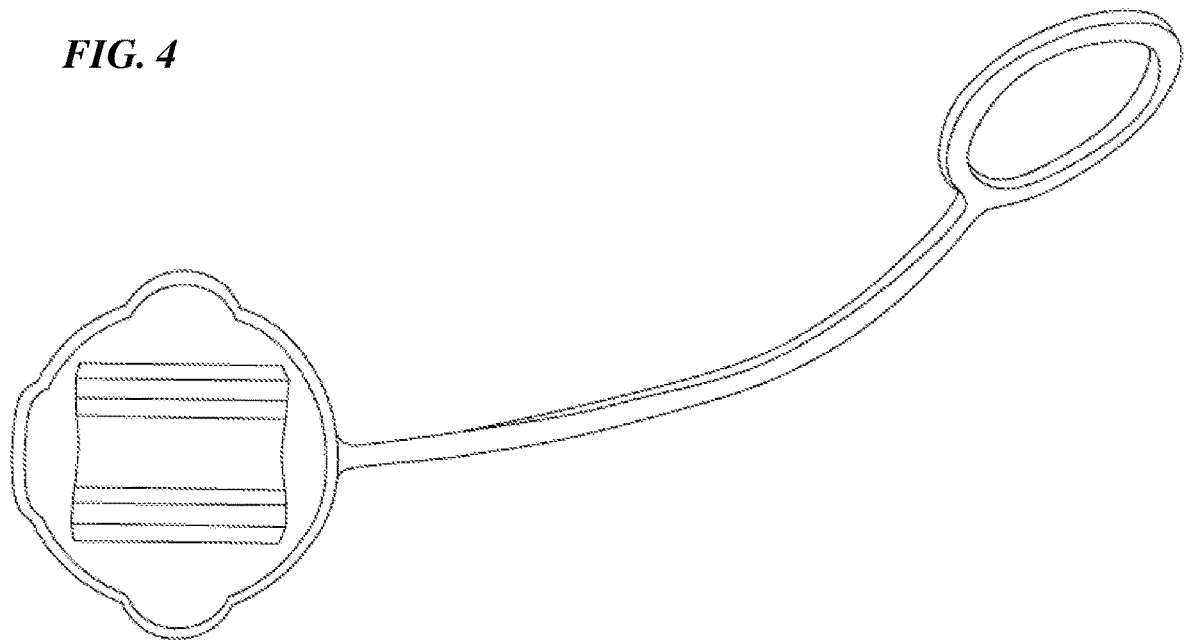
FIG. 4 is a top perspective view thereof.
Figure 5:
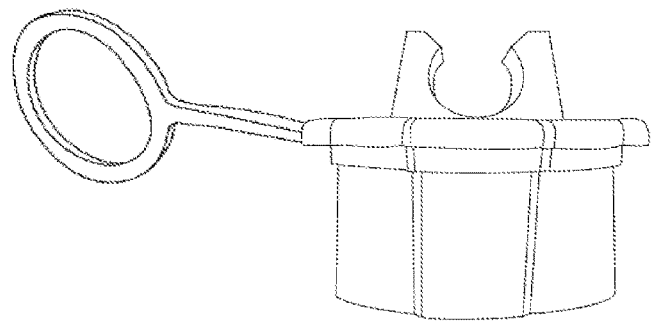
FIG. 5 is a front perspective view thereof.
Figure 6:
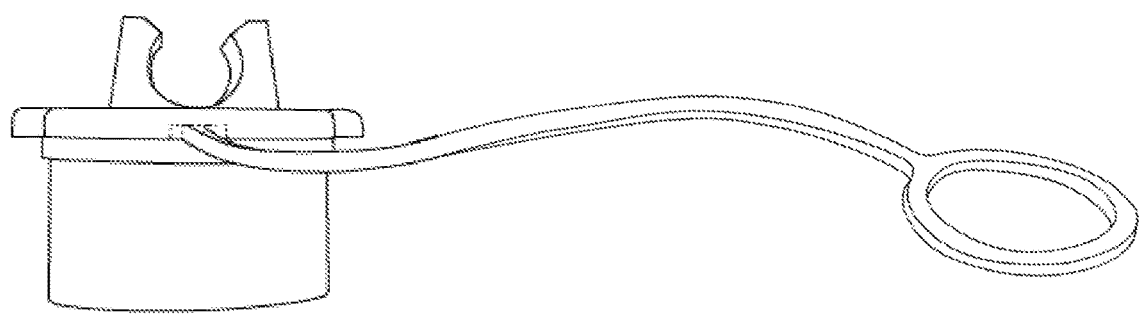
FIG. 6 is a back perspective thereof.
Figure 7:
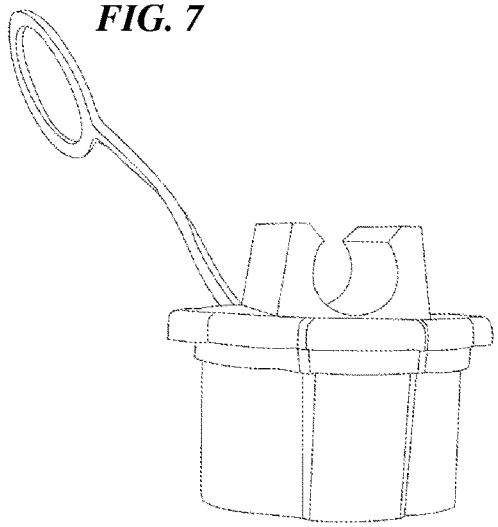
FIG. 7 is a side-front perspective view thereof.
Figure 8:
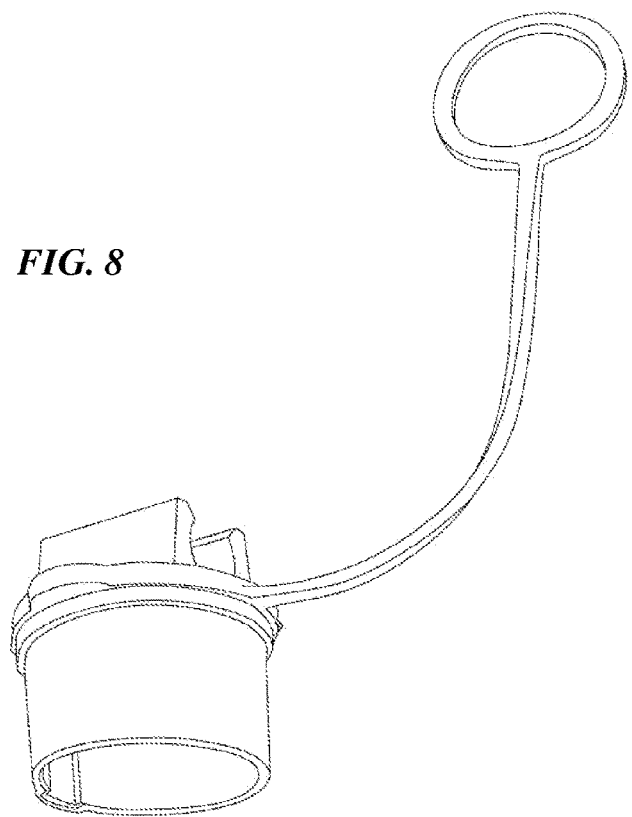
FIG. 8 is a side-bottom perspective view thereof.

FIG. 1 is a left-side perspective view of the trailer-light plug cover with strap and cord clamp according to one embodiment of the present invention; FIG. 2 is a right-side perspective view thereof; FIG. 3 is a bottom perspective view thereof; FIG. 4 is a top perspective view thereof; FIG. 5 is a front perspective view thereof; FIG. 6 is a back perspective thereof; FIG. 7 is a side-front perspective view thereof; and FIG. 8 is a side-bottom perspective view thereof.

FIG. 9A is the side-front perspective view of trailer-light plug cover 900, according to some embodiments of the present invention. In some embodiments, trailer-light plug cover 900 includes strap 912 connected at one end to elastic loop 911 and at the opposite end to the top 913 of elastic sleeve 920. In some embodiments, the elastic loop 911 is stretchy enough to be stretched over handles 96 of plug 99, so it can be placed around cord 97, and then contract so it does not come off around handles 96, in order to that trailer-light plug cover 900 can always stay attached to cord 97.

Elastic sleeve 920 includes an outer surface 910 and an inner surface 914. Trailer-light plug 99 and its cord 97, its alignment ridge 98, and its two handles 96, are shown in dashed lines. In some embodiments, elastic sleeve 920 stretches enough to be placed around plug 99, and then contract to stay in place. In some embodiments, inner surface 914 includes a groove that aligns with a corresponding ridge 98 of the trailer-light plug 99. In some embodiments, elongated open-ended clamp feature 921 includes a planar outer wall surface 917 on both outside faces, a planar top surface 927 on top of both side walls 917, a tapered guide surface 928 inside each top surface 927, which has a wider spacing distal to inner cylindrical surface 918 and a narrower spacing proximal to inner cylindrical surface 918, which helps guide cord 97 inside the concave inner surface 918 of clamp feature 917. Elongated clamp feature 921 is molded as part of, and extending outward from, a top surface of top cover portion 913 of elastic sleeve 920. Elongated clamp feature 921 and keeps trailer-light plug cover 900 snugly connected to cord 97 when plug 99 is inserted into its corresponding socket on the vehicle connected to the trailer to which cord 97 is connected. In some embodiments, a plurality of small ears 914 extend from the edges of top cover portion 913 for use in grasping trailer-light plug cover 900 in order to remove trailer-light plug cover 900 from plug 99. In some embodiments, a reinforcing ring 919 is integrally molded to the junction between top cover portion 913 and sleeve 920. In some embodiments of the apparatus, the elastic loop 911 is stretchy enough to be stretched over handles 96 of plug 99, in order to be placed around cord 97.

FIG. 9B is the back-bottom-side perspective view of trailer-light plug cover 900, according to some embodiments of the present invention. The reference numbers and features of FIG. 9B correspond to like numbers and features of FIG. 9A.

Some embodiments of the invention use a method that includes forming an elastic sleeve 920; integrally forming a completely (or at least substantially completely) covering one end of the elastic sleeve 920; integrally forming an elongated clamp feature 921 across a top surface of the top cover portion 913, wherein the elongated clamp feature 921 has a C-shaped cross section; integrally forming an elongated strap 912 connected at a proximal end to an edge of top cover portion 913 and having an elastic loop formed at a distal end of the elongated strap 912.

Some embodiments of the method further include integrally forming a plurality of rounded ears 914 extending radially outward from an outer edge of top cover portion 913.

In some embodiments of the method, the forming of elongated open-ended clamp feature 921 further includes forming a tapered guide surface 918' having a narrower edge spacing proximal to an inner concave cylindrical surface 918, and a wider edge spacing distal to the inner concave cylindrical surface 918, in order to help guide cord 97 into an inside of the concave inner surface 918 of clamp feature 921.

Some embodiments of the present invention include an apparatus that includes an elastic sleeve 920; an integrally formed top cover 913 that completely (or at least substantially completely) covers one end of the elastic sleeve 920; an integrally formed elongated clamp feature 921 that extends outward from across a top surface of the top cover 913, wherein the elongated clamp feature 921 has a C-shaped cross section; an integrally formed elongated strap 912 that is connected at a proximal end to an edge of top cover 913 and has an elastic loop formed at a distal end of the elongated strap 912.

Some embodiments of the apparatus further include a plurality of rounded ears 914 integrally formed to extend radially outward from an outer edge of top cover portion 913.

In some embodiments of the apparatus, the elongated open-ended clamp feature 921 further includes a tapered guide surface 928 having a narrower edge spacing proximal to an inner concave cylindrical surface 918, and a wider edge spacing distal to the inner concave cylindrical surface 918, in order to help guide cord 97 into an inside of the concave inner surface 918 of clamp feature 921.

In some embodiments of the apparatus, the elastic loop 911 is stretchy enough to be stretched over handles 96 of plug 99, in order to be placed around cord 97.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for protecting an electrical plug, the apparatus comprising:
    an elastic sleeve, wherein the elastic sleeve is configured to be placed around the electrical plug;
    an integrally formed top cover that at least substantially covers one end of the elastic sleeve;
    an integrally formed elongated clamp feature that extends outward from across a top surface of the top cover for clamping the top cover to a cord of the electrical plug; and
    an integrally formed elongated strap that is connected at a proximal end of the elongated strap to an edge of the top cover and that has an elastic loop formed in the elongated strap distal to the top cover.

2. The apparatus of claim 1, wherein the elongated clamp feature has a C-shaped cross section.

3. The apparatus of claim 1, wherein the elongated clamp feature includes:
    an inner cylindrical surface, and
    a plurality of tapered guide surfaces including a first tapered guide surface and a second tapered guide surface, wherein the first tapered guide surface has a wider spacing distal to the inner cylindrical surface and a narrower spacing proximal to the inner cylindrical surface.

4. The apparatus of claim 1, wherein the elongated clamp feature includes:
    an inner cylindrical surface,
    a plurality of planar outer wall surfaces including a first planar outer wall surface and a second planar outer wall surface, a plurality of planar top surfaces including a first planar top surface and a second planar top surface, and a plurality of tapered guide surfaces including a first tapered guide surface and a second tapered guide surface, wherein the first planar top surface is on top of the first planar out wall surface, wherein the first tapered guide surface is inside the first planar top surface, and wherein the first tapered guide surface has a wider spacing distal to the inner cylindrical surface and a narrower spacing proximal to the inner cylindrical surface.

5. The apparatus of claim 1, further comprising:
a plurality of rounded ears that extend radially outward from an outer edge of the top cover.

6. The apparatus of claim 1, further comprising:
a reinforcement ring integrally molded to a junction between the top cover and the elastic sleeve.

7. The apparatus of claim 1, wherein an inner surface of the plastic sleeve includes a groove that aligns with a corresponding ridge on the electrical plug.

8. The apparatus of claim 1, wherein the elastic loop at the distal end of the elongated strap is configured to fit over the electrical plug such that the apparatus remains coupled to the electrical plug when the elastic sleeve is not placed around the electrical plug.

9. The apparatus of claim 1, wherein the elastic loop at the distal end of the elongated strap is configured to fit over the electrical plug to provide a first connection between the apparatus and the electrical plug, and wherein the elongated clamp feature is configured to snap onto a cord of the electrical plug to provide a second connection between the apparatus and the electrical plug.

10. A method for protecting an electrical plug, the method comprising:
forming a plug-protection device, wherein the forming of the plug-protection device includes: forming an elastic sleeve;
integrally forming a top cover substantially completely covering one end of the elastic sleeve; integrally forming an elongated clamp feature across a top surface of the top cover for clamping the top cover to a cord of the electrical plug; and
integrally forming an elongated strap connected at a proximal end of the strap to an edge of the top cover and having an elastic loop formed in the elongated strap distal to the top cover.

11. The method of claim 10, further comprising coupling the plug-protection device to the electrical plug by placing the elastic sleeve around the electrical plug.

12. The method of claim 10, wherein the elongated clamp feature has a C-shaped cross section.

13. The method of claim 10, wherein the forming of the elongated clamp feature includes:
forming an inner cylindrical surface, and
forming a plurality of tapered guide surfaces including a first tapered guide surface and a second tapered guide surface, wherein the first tapered guide surface has a wider spacing distal to the inner cylindrical surface and a narrower spacing proximal to the inner cylindrical surface.

14. The method of claim 10, wherein the forming of the elongated clamp feature includes:
forming an inner cylindrical surface,
forming a plurality of planar outer wall surfaces including a first planar outer wall surface and a second planar outer wall surface,
forming a plurality of planar top surfaces including a first planar top surface and a second planar top surface, and
forming a plurality of tapered guide surfaces including a first tapered guide surface and a second tapered guide surface, wherein the first planar top surface is on top of the first planar out wall surface, wherein the first tapered guide surface is inside the first planar top surface, and wherein the first tapered guide surface has a wider spacing distal to the inner cylindrical surface and a narrower spacing proximal to the inner cylindrical surface.

15. The method of claim 10, wherein the forming of the plug-protection device further includes:
integrally forming a plurality of rounded ears extending radially outward from an outer edge of the top cover.

16. The method of claim 10, wherein the forming of the plug-protection device further includes:
integrally molding a reinforcing ring to a junction between the top cover and the elastic sleeve.

17. The method of claim 10, wherein the forming of the plastic sleeve includes forming a groove along an inner surface of the plastic sleeve, wherein the groove aligns with a corresponding ridge on the electrical plug.

18. The method of claim 10, further comprising:
fitting the elastic loop at the distal end of the elongated strap over the electrical plug such that the plug-protection device remains coupled to the electrical plug when the elastic sleeve is not placed around the electrical plug.

19. The method of claim 10, further comprising:
fitting the elastic loop at the distal end of the elongated strap over the electrical plug to provide a first connection between the plug-protection device and the electrical plug; and
snapping the elongated clamp feature onto a cord of the electrical plug to provide a second connection between the plug-protection device and the electrical plug.

* * * * *